United States Patent [19]

Acantilado

[11] Patent Number: 5,945,966
[45] Date of Patent: Aug. 31, 1999

[54] COMPUTER PROGRAM FOR A THREE-DIMENSIONAL VOLUMETRIC DISPLAY

[75] Inventor: Neil P. Acantilado, San Diego, Calif.

[73] Assignee: The United States of America as represented by the Secretary of the Navy, Washington, D.C.

[21] Appl. No.: 08/726,305

[22] Filed: Oct. 2, 1996

[51] Int. Cl.[6] .................................................. G09G 5/00
[52] U.S. Cl. ................................................ 345/6; 345/84
[58] Field of Search .............................. 345/84, 87, 108, 345/110, 516, 6, 31, 32, 95; 348/740, 790, 792

[56] References Cited

U.S. PATENT DOCUMENTS

| | | | |
|---|---|---|---|
| 4,692,878 | 9/1987 | Ciongoli | 345/31 |
| 5,024,494 | 6/1991 | William et al. | |
| 5,686,939 | 11/1997 | Millward et al. | 345/84 |

OTHER PUBLICATIONS

Soltan et al, Laser Based 3D Volumetric Display System, SPIE, 02–1992, pp. 1–11.

*Primary Examiner*—Chang Nguyen
*Attorney, Agent, or Firm*—Harry Fendelman; Michael A. Kagan; Eric James Whitesell

[57] ABSTRACT

A method for transforming world coordinates into device coordinates comprises the steps of inputting a set of world coordinates to be displayed, scaling the world coordinates into view coordinates bounded by a display volume, finding a control memory location of a light beam deflector corresponding to a Y-axis position for each of the view coordinates, calculating X-axis and Z-axis device coordinates from the view coordinates for deflecting a light beam to a selected point within the display volume corresponding to each of the view coordinates, and loading the device coordinates into the control memory locations corresponding to the Y-axis position for each of the view coordinates to cause the light beam to be deflected to each selected point.

4 Claims, 5 Drawing Sheets

| FIG. 2A | FIG. 2B |

| Z ADDRESS ($m_Z$) | X-DEFLECTION VALUE | Y-DEFLECTION VALUE | |
|---|---|---|---|
| 0 | $X_0$ | $Y_0$ | $I_0$ |
| 1 | $X_1$ | $Y_1$ | $I_1$ |
| .. | .. | .. | .. |
| .. | .. | .. | .. |
| MAX-1 | $X_{MAX-1}$ | $Y_{MAX-1}$ | $I_{MAX-1}$ |
| MAX | $X_{MAX}$ | $Y_{MAX}$ | $I_{MAX}$ |

FIG. 4

COMPUTER PROGRAM FOR A THREE-DIMENSIONAL VOLUMETRIC DISPLAY

BACKGROUND OF THE INVENTION

The present invention relates to methods for generating images in volumetric displays. More specifically, but without limitation thereto, the present invention relates to a computer program for controlling beam deflectors of a three-dimensional volumetric display.

3-D display technologies such as holography, stereoscopic displays, and advanced 3-D graphics engines generally render 3-D images on a two-dimensional display by mapping the coordinates of the 3-D images into 2-D perspective. However, these technologies lack the physiological depth cues needed for true 3-D display imaging, such as motion parallax, accommodation, convergence, and binocular disparity. A 3-D volumetric display provides the physiological depth cues needed for such applications as air traffic control, submarine undersea navigation, and medical imaging.

3-D volumetric displays using a two-dimensional display surface having a periodic motion inside a display volume require a graphics engine that transforms conveniently represented world coordinates of actual scenes into device coordinates. The device coordinates control light beam deflectors that direct light beams to a display surface that has a periodic motion within the display volume. The display scatters the light beams from different positions within the display volume to generate a time multiplexed representation of the desired scene.

Because the device coordinates must accommodate a display surface that may have a variety of shapes and different types of periodic motion, each volumetric display may require different device coordinates to generate the same image. However, generating different device coordinates for the same image for each type of volumetric display can be an expensive and error-prone task.

A need therefore exists for a method to transform conveniently represented world coordinates into the device coordinates that can control the beam deflectors of a variety of volumetric displays.

SUMMARY OF THE INVENTION

The method for transforming world coordinates into device coordinates for a volumetric display of the present invention is directed to overcoming the problems described above, and may provide further related advantages. No embodiment of the present invention described herein should be construed to preclude other embodiments or advantages that may exist or become obvious to those skilled in the art.

The method of the present invention for transforming world coordinates into device coordinates comprises the steps of inputting a set of world coordinates to be displayed, scaling the world coordinates into view coordinates bounded by a display volume, finding a control memory location of a light beam deflector corresponding to a Y-axis position for each of the view coordinates, calculating X-axis and Z-axis device coordinates from the view coordinates for deflecting a light beam to a selected point within the display volume corresponding to each of the view coordinates, and loading the device coordinates into the control memory locations corresponding to the Y-axis position for each of the view coordinates to cause the light beam to be deflected to each selected point.

An advantage of the method of the present invention is that conveniently represented world coordinates may be mapped automatically into device coordinates for a variety of three-dimensional volumetric displays.

Another advantage is that a variety of display surfaces and types of periodic motion used in volumetric displays may be readily be accommodated by the present invention, thus providing a standard interface for displaying world coordinates.

The features and advantages summarized above in addition to other aspects of the present invention will become more apparent from the description, presented in conjunction with the following drawings.

BRIEF DESCRIPTION OF THE DRAWINGS

FIG. 4 is memory map of the control memory circuit of FIG. 2.

DESCRIPTION OF THE INVENTION

The following description is presented solely for the purpose of disclosing how the present invention may be made and used. The scope of the invention is defined by the claims.

Figure 1:
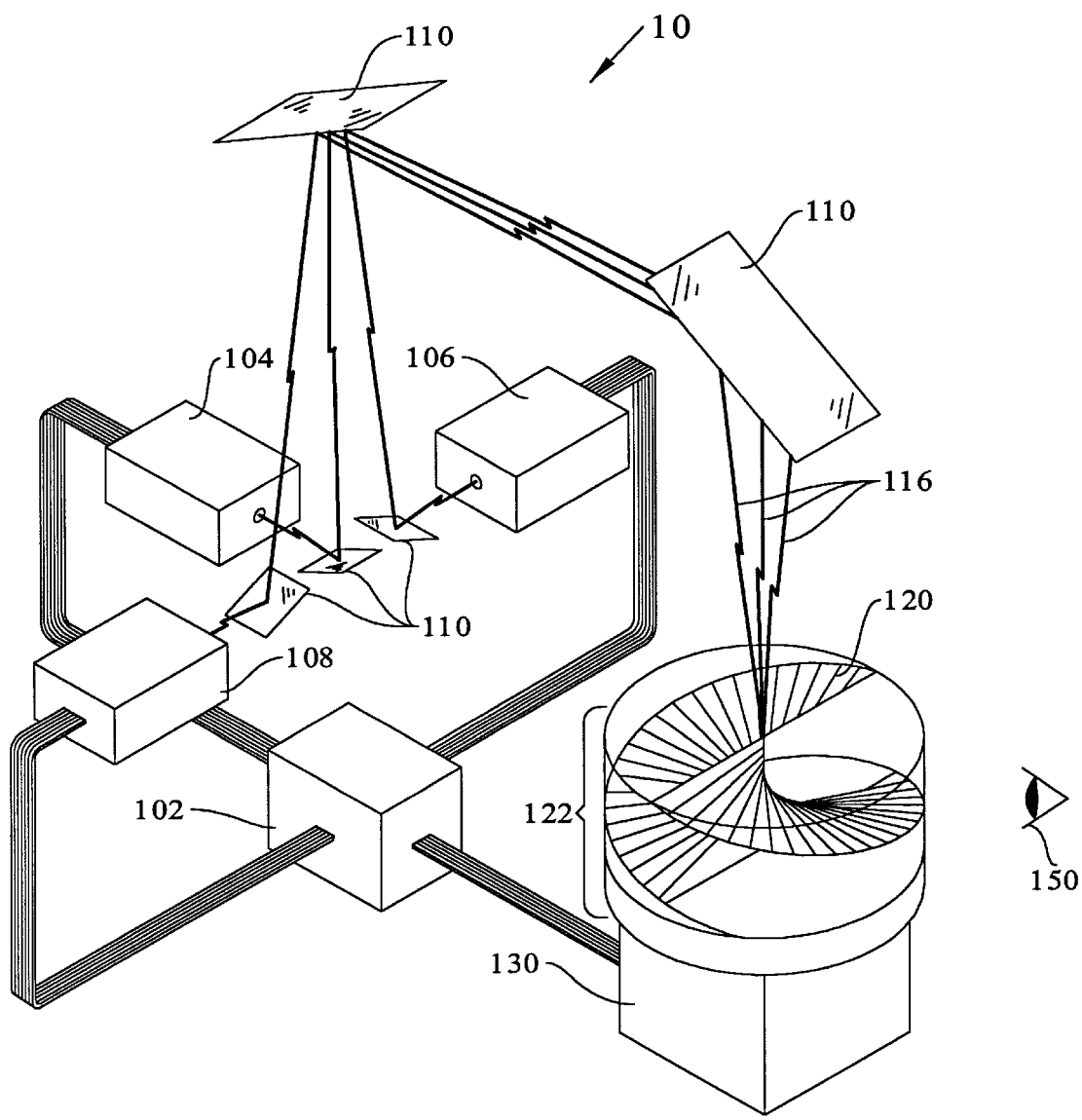
FIG. 1 is a diagram of a 3-D volumetric display with a rotating double helix display surface.

In FIG. 1, a 3-D volumetric display 10 comprises beam deflector control circuit 102, beam deflectors 104, 106, and 108, mirrors 110, a display surface 120, and a drive motor 130. In this example, display surface 120 is implemented as a double helix, although other surface geometries may also be used, such as a single helix, a tilted circle, a multiple helix, and a piston, etc. Drive motor 130 imparts a periodic motion to display surface 120 within a display volume 122. Beam deflector control circuit 102 inputs world coordinates of a scene and causes beam deflectors 104, 106, and 108 to direct light beams 116 onto display surface 120 from mirrors 110. Light beams 116 illuminate view coordinates on display surface 120 to generate an image representative of the scene corresponding to the input world coordinates. The motion of display surface 120 scatters light from light beams 116 from different positions within display volume 122, time-multiplexing the illuminated view coordinates to generate a complete three-dimensional image to the eye of an observer 150.

Figures 2, 2A:
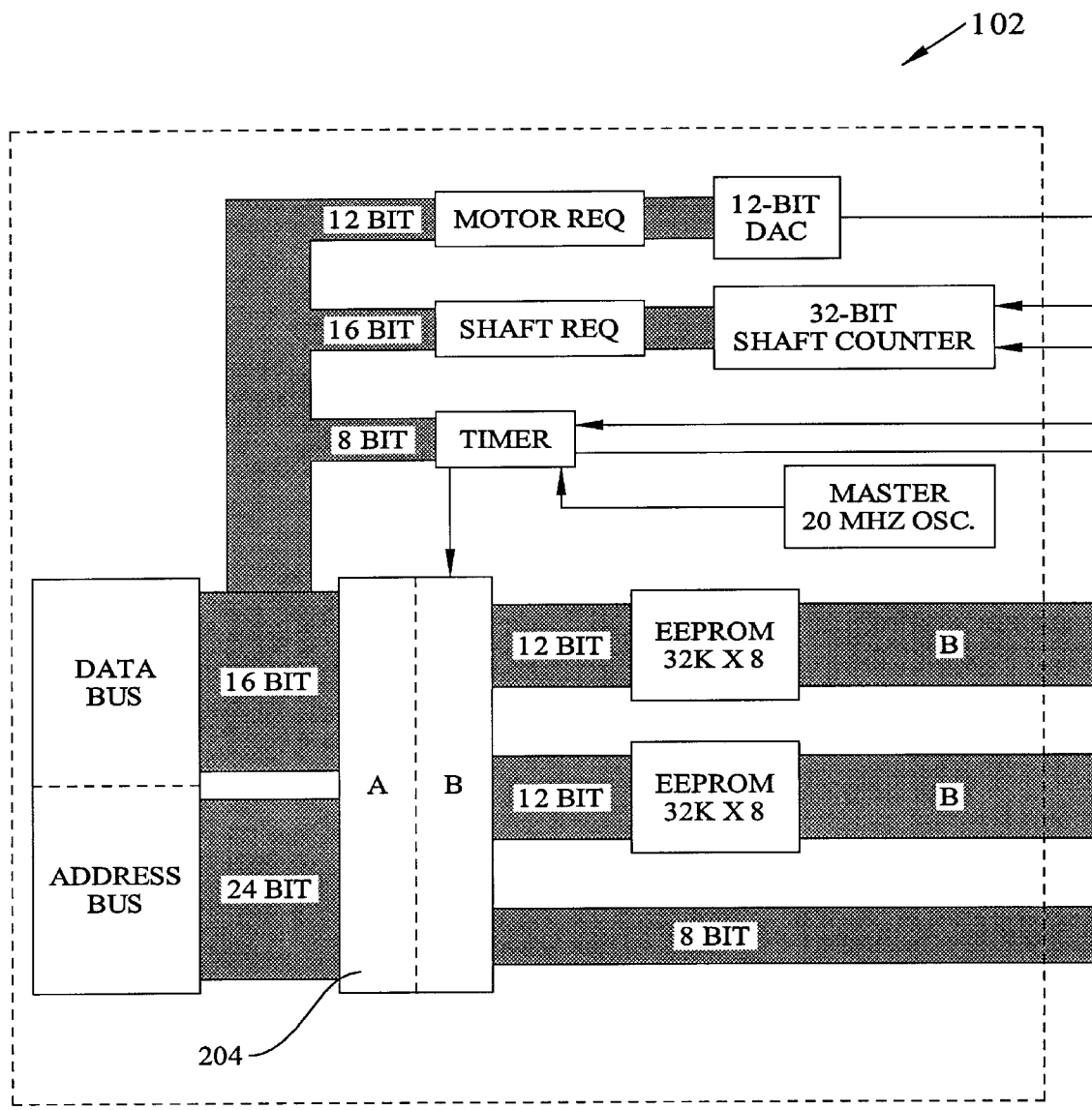
FIG. 2 is a diagram of a beam deflector drive circuit for the 3-D volumetric display of FIG. 1.
Figure 2B:
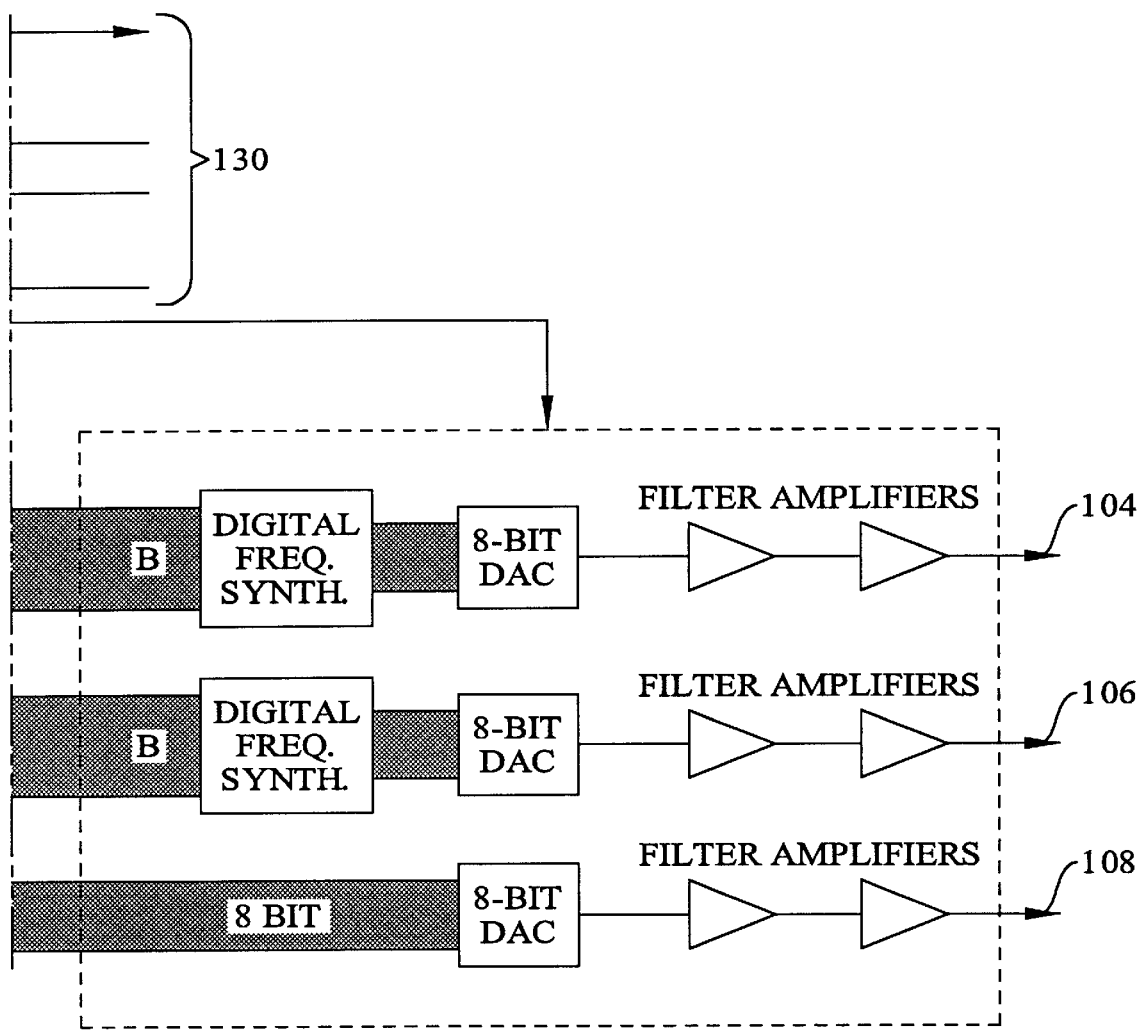

FIG. 2 is a diagram of beam deflector control circuit 102 in FIG. 1. A dual port RAM 204 is used to load device coordinates corresponding to the view coordinates into one portion of memory while outputting the previously loaded device coordinates from another portion of memory to beam deflectors 104, 106, and 108.

Figure 3:
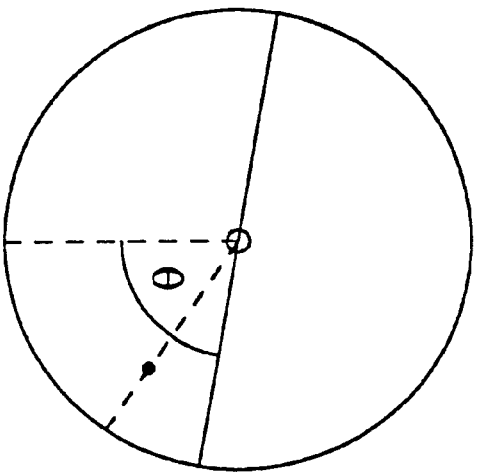
FIG. 3 is a diagram of the geometric relationships of a double helix for calculating the Z-axis position on the double helix as a function of the angle of rotation.
Figure 3:
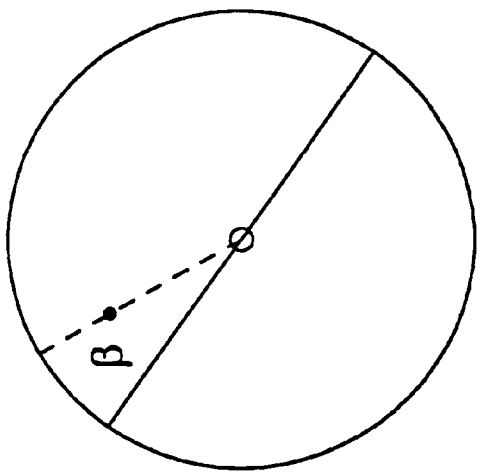
Figure 3:
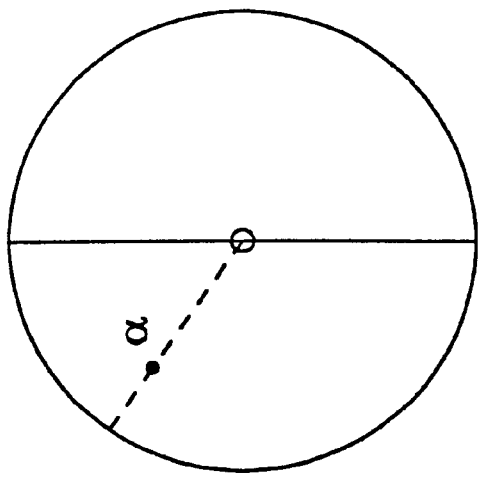

FIG. 3 shows the geometry of display surface 120 in FIG. 1 to illustrate a calculation of the Z-axis position as a function of the angle of rotation. For a given (x,y) view coordinate, a voxel (illuminated view coordinate) may be placed at a height ranging from 0 to h, where h is the height of display surface 120. The height of the voxel corresponds to a location in dual port RAM 204. To find this location, the amount of angular rotation of display surface 120 from a reference angle of 0 may be expressed by the formula:

$$\alpha = \tan^{-1}\left\{\frac{z}{x}\right\}$$

The additional amount of rotation required for display surface 120 to reach the desired height z may be expressed as:

$$\beta = \Pi\left\{\frac{y}{h}\right\}$$

The total angle of rotation θ is the sum:

$$\theta = \tan^{-1}\left\{\frac{z}{x}\right\} + \Pi\left\{\frac{y}{h}\right\}$$

If the maximum number of voxels displayed per image refresh is mapped as a memory address MAX in dual port RAM 204, the desired memory address m may be expressed by:

$$m = \left\{\frac{\theta}{\Pi}\right\} \cdot \text{MAX} = \left[\frac{1}{\Pi}\tan^{-1}\left\{\frac{z}{x}\right\} + \left\{\frac{y}{h}\right\}\right] \cdot \text{MAX}$$

FIG. 4 is a table illustrating how dual port RAM may be mapped into device coordinates. The contents of each Y-axis address ranging from 0 to MAX is divided into device coordinates comprising a x-deflection value, a z-deflection value, and an intensity value.

World coordinates may be input to beam deflector control circuit 102 and scaled into viewing coordinates appropriate to display volume 122 by well known devices such as a computer according to well known techniques.

Device coordinates $X_D$, $Y_D$ and $Z_D$ may be calculated from the geometry of display volume 120 and beam deflectors 104, 106 and 108 by scaling the world coordinates to the view coordinates of display volume 120. The view coordinates may then be normalized to display volume 122 and transformed into device coordinates to control each beam deflector 104, 106, and 108. By way of example, device coordinates for $X_D$, $Y_D$, and $Z_D$ for volumetric display 10 may be calculated from the following:

$$X=((X-X0)/(H0+Y))*H0+X0$$

$$Z=((Z-Z0)/(H0+Y))*H0+Z0$$

$$AP1=(X-X1)*((A4-A1)/(X4-X1))+A1$$

$$AP2=(X-X2)*((A3-A2)/(X3-X2))+A2$$

$$X_D=(Z-Z1)*((AP2-AP1)/(Z2-Z1))+AP1$$

$$BP1=(Z-Z1)*((B4-B1)/(Z4-Z1))+B1$$

$$BP2=(Z-Z2)*((B3-B2)/(Z3-Z2))+B2$$

$$Z_D=(X-X1)*((BP2-BP1)/(X2-X1))+BP1$$

where (X0, Z0) are the view coordinates corresponding to a perpendicular line through the display volume to a beam deflector.

H0 is the distance between a beam deflector and an upper boundary of the display volume.

(A1, B1) are device coordinates corresponding to a location at the upper right of the display volume.

(X1, Z1) are view coordinates corresponding to a location at the upper right of the display volume.

(A2, B2) are device coordinates corresponding to a location at the upper left of the display volume.

(X2, Z2) are view coordinates corresponding to a location at the upper left of the display volume.

(A3, B3) are device coordinates corresponding to a location at the bottom left of the display volume.

(X3, Z3) are view coordinates corresponding to a location at the bottom left of the display volume.

(A4, B4) are device coordinates corresponding to a location at the bottom right of the display volume.

(X4, Z4) are view coordinates corresponding to a location at the bottom right of the display volume.

The values calculated for the device coordinates may then be loaded into the control memory locations corresponding to the Y-axis position for each of the view coordinates.

The method described above may readily be implemented as a computer program according to well known techniques.

Other modifications, variations, and applications of the present invention may be made in accordance with the above teachings other than as specifically described to practice the invention within the scope of the following claims.

I claim:

1. A method for displaying world coordinates in a volumetric display comprising the steps of:

inputting a set of world coordinates to be displayed;

scaling the world coordinates into view coordinates bounded by a display volume;

finding a control memory location of a light beam deflector corresponding to a Y-axis position for each of the view coordinates;

calculating X-axis and Z-axis device coordinates from the view coordinates for deflecting a light beam to a selected point within the display volume corresponding to each of the view coordinates; and loading the device coordinates into the control memory locations corresponding to the Y-axis position for each of the view coordinates to cause the light beam to be deflected to each selected point, wherein the step of determining a control memory location corresponding to a Y-axis position for each of the view coordinates includes determining each control memory location substantially from the following formula:

$$m = \left[\frac{1}{\Pi}\tan^{-1}\left\{\frac{z}{x}\right\} + \left\{\frac{y}{h}\right\}\right] \cdot \text{MAX}$$

where m is the control memory location, y is a Y-axis view coordinate, x is an X-axis view coordinate, z is a Z-axis view coordinate, h is a display height, and MAX is the total of addressable Y-axis positions.

2. The method of claim 1, wherein the step of calculating device coordinates includes calculating device coordinates substantially from the following formulas:

$$X=((X-X0)/(H0+Y))*H0+X0$$

$$Z=((Z-Z0)/(H0+Y))*H0+Z0$$

$$AP1=(X-X1)*((A4-A1)/(X4-X1))+A1$$

$$AP2=(X-X2)*((A3-A2)/(X3-X2))+A2$$

$$X_D=(Z-Z1)*((AP2-AP1)/(Z2-Z1))+AP1$$

$$BP1=(Z-Z1)*((B4-B1)/(Z4-Z1))+B1$$

$$BP2=(Z-Z2)*((B3-B2)/(Z3-Z2))+B2$$

$$Z_D=(X-X1)*((BP2-BP1)/(X2-X1))+BP1$$

wherein:

(X, Y) are initially world coordinates scaled to view coordinates;

(X0, Z0) are view coordinates corresponding to a line perpendicular to an upper boundary of the display volume;

H0 is the distance between a beam deflection point and an upper boundary of the display volume;

(A1, B1) are device coordinates corresponding to a location at the upper right of the display volume;

(X1, Z1) are view coordinates corresponding to a location at the upper right of the display volume;

(A2, B2) are device coordinates corresponding to a location at the upper left of the display volume;

(X2, Z2) are view coordinates corresponding to a location at the upper left of the display volume;

(A3, B3) are device coordinates corresponding to a location at the bottom left of the display volume;

(X3, Z3) are view coordinates corresponding to a location at the bottom left of the display volume;

(A4, B4) are device coordinates corresponding to a location at the bottom right of the display volume;

(X4, Z4) are view coordinates corresponding to a location at the bottom right of the display volume;

AP1, AP2, BP1, and BP2 are intermediate results;

$X_d$ is the X-axis device coordinate; and $Z_D$ is the Z-axis device coordinate.

3. A computer program product comprising:

a medium for embodying a computer program for input to a computer; and a computer program embodied in said medium for causing said computer to transform world coordinates into device coordinates for a volumetric display by performing the following functions:

inputting a set of world coordinates to be displayed;

scaling the world coordinates into view coordinates bounded by a display volume;

finding a control memory location of a light beam deflector corresponding to a Y-axis position for each of the view coordinates;

calculating device coordinates from the view coordinates for directing a light beam to a selected point within the display volume corresponding to each of the view coordinates; and loading the device coordinates into the control memory locations corresponding to Y-axis position for each of the view coordinates to cause the light beam to be deflected to each selected point, wherein the step of determining a control memory location corresponding to a Y-axis position for each of the view coordinates includes determining each control memory location substantially from the following formula:

$$m = \left[\frac{1}{\Pi}\tan^{-1}\left\{\frac{z}{x}\right\} + \left\{\frac{y}{h}\right\}\right] \cdot \text{MAX}$$

where m is the control memory location, y is a Y-axis view coordinate, x is an X-axis view coordinate, z is a Z-axis view coordinate, h is a display heights and MAX is the total of addressable Y-axis positions.

4. The computer product of claim 3 wherein the step of calculating device coordinates includes calculating device coordinates substantially from the following formulas:

$$X=((X-X0)/(H0+Y))*H0+X0$$

$$Z=((Z-Z0)/(H0+Y))*H0+Z0$$

$$AP1=(X-X1)*((A4-A1)/(X4-X1))+A1$$

$$AP2=(X-X2)*((A3-A2)/(X3-X2))+A2$$

$$X_D=(Z-Z1)*((AP2-AP1)/(Z2-Z1))+AP1$$

$$BP1=(Z-Z1)*((B4-B1)/(Z4-Z1))+B1$$

$$BP2=(Z-Z2)*((B3-B2)/(Z3-Z2))+B2$$

$$Z_D=(X-X1)*((BP2-BP1)/(X2-X1))+BP1$$

wherein:

(X, Y) are initially world coordinates subsequently scaled to view coordinates;

(X0, Z0) are view coordinates corresponding to a line perpendicular to an upper boundary of the display volume;

H0 is the distance between a beam deflection point and an upper boundary of the display volume;

(A1, B1) are device coordinates corresponding to a location at the upper right of the display volume;

(X1, Z1) are view coordinates corresponding to a location at the upper right of the display volume;

(A2, B2) are device coordinates corresponding to a location at the upper left of the display volume;

(X2, Z2) are view coordinates corresponding to a location at the upper left of the display volume;

(A3, B3) are device coordinates corresponding to a location at the bottom left of the display volume;

(X3, Z3) are view coordinates corresponding to a location at the bottom left of the display volume;

(A4, B4) are device coordinates corresponding to a location at the bottom right of the display volume;

(X4, Z4) are view coordinates corresponding to a location at the bottom right of the display volume;

AP1, AP2, BP1, and BP2 are intermediate results;

$X_d$ is the X-axis device coordinate; and $Z_D$ is the Z-axis device coordinate.

\* \* \* \* \*